May 4, 1937.  D. B. BANKS ET AL  2,078,992
METHOD AND APPARATUS FOR DEWAXING OILS
Filed April 13, 1934
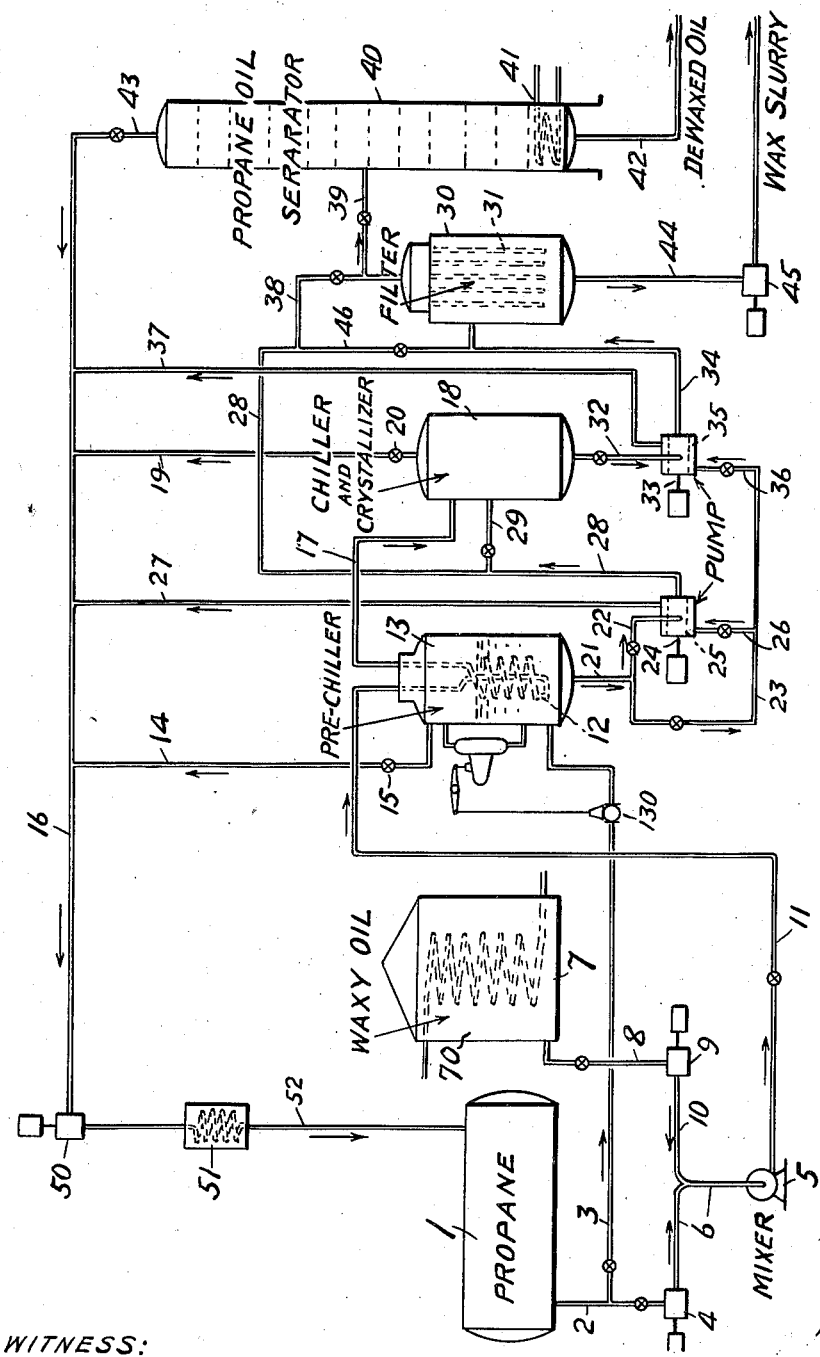
WITNESS:
INVENTORS
Daniel B. Banks
Paul D. Barton
BY
Busser and Harding
ATTORNEYS.

Patented May 4, 1937

2,078,992

UNITED STATES PATENT OFFICE 2,078,992

METHOD AND APPARATUS FOR DEWAXING OILS

Daniel B. Banks, Upper Darby, Pa., and Paul D. Barton, Scarsdale, N. Y., assignors, by mesne assignments, to Sun Oil Company, Philadelphia, Pa., a corporation of New Jersey Application April 13, 1934, Serial No. 720,416

8 Claims. (Cl. 62—170)

The present invention relates to an apparatus for propane dewaxing and more specifically to an apparatus for preventing vaporization of propane from propane-oil solutions while being pumped from one piece of equipment to another.

In the operation of propane dewaxing plants considerable difficulty has been experienced in pumping oil-propane solutions due to the fact that it is impossible to insulate transfer lines and pumps thoroughly enough to prevent absorption of heat by the oil-propane solution through such insulation. This absorption of heat is often sufficient to raise the vapor pressure of the propane to a point above the capacity of the pump to pick up the solution, thus causing vaporization of propane and consequent vapor lock in the system. For instance, with propane at —30° F. a rise in temperature of 1° F. will cause a rise in pressure of about .5 pound per square inch and since the temperature of the outside air may be between 30° and 90° F., the temperature difference of 60–120° F. might easily cause a rise of several degrees Fahrenheit in the oil-propane solution, even with the best of insulation.

It is, therefore, an object of the present invention to provide an apparatus for the propane dewaxing of oil in which a rise in temperature of the solution being pumped is avoided.

The accompanying drawing illustrates diagrammatically one form of apparatus which may be used to practice the present invention.

In the drawing, I designates a storage tank for propane or other light liquefied hydrocarbon refrigerant. Propane is withdrawn from the tank through valved line 2, having a valved branch 3 extending therefrom. A pump 4 receives liquid flowing through the main line 2 and passes it under pressure to a rotary mixing device 5 through line 6. Meanwhile, wax-containing oil, which has been stored in tank 7 is withdrawn through valved line 8 by means of pump 9 and is passed through line 10 to line 6, where it meets the propane from tank 1 and flows through the rotary mixing device 5 and is intimately mixed therewith.

It is desirable that a heating coil 70 be supplied to oil storage tank 7 in order to heat the oil sufficiently to impart enough heat so that the oil-propane mixture flowing from the rotary mixing device 5 will have a temperature varying from 90 to 120° F., depending upon the viscosity and wax content of the oil to be dewaxed.

The oil-propane solution passes from the mixing device 5 through valved line 11 to a preliminary cooling coil 12 situated in propane chilling tank 13. Propane is admitted to the chilling tank 13 through line 3 by means of float controlled valve 130, the float controlling the level of propane within the tank 13 so as to maintain it at approximately that diagrammatically shown in the drawing. The propane within the tank 13 is chilled by permitting a portion of it to evaporate. This is accomplished by opening valve 15 in line 14, leading to gaseous propane return header 16. Valve 15 may be thermostatically controlled, if desired, so as to maintain the propane within the tank 13 at an even predetermined temperature.

The propane-oil mixture in passing through coil 12 within the tank 13 is chilled to, say, 20° F. and passes from the coil through line 17 to the chiller and crystallizer 18. This chiller and crystallizer 18 is supplied with a vent line 19, equipped with a valve 20, to the gaseous propane return header 16. The oil-propane mixture within the chiller and crystallizer 18 is chilled to its final dewaxing temperature, which may be from —20 to —60° F., depending upon the degree of dewaxing desired, by opening valve 20 in line 19 and permitting evaporation of propane from the propane-oil solution.

Chilling tank 13 is also used as a storage tank for chilled propane to be used in other parts of the system. For instance, sufficient propane may not be added to the oil in mixer 5 to give the complete degree of chilling required for dewaxing. It will therefore be necessary to add more propane, preferably chilled, to the chiller and crystallizer 18. For this purpose the chilling tank 13 is provided with an outlet 21 having valved branches 22 and 23. The valved branch 22 leads to a pump 24 having a jacket 25 around the pump cylinder. A valved line 26 leads from line 23 to this jacket and a vent line 27 leads from this chamber to the gaseous propane return header 16. The outlet of the pump cylinder is connected to line 28 leading to valved line 29, which in turn leads to chiller and crystallizer 18 and to other apparatus, as will hereinafter be more fully described.

The chamber surrounding the cylinder of pump 24 is provided in order that liquid propane may be evaporated therein to chill the cylinder to a temperature below that of the propane being pumped and consequently prevent vaporization of the liquid propane being forced by the pump through line 28. Insulation has been found insufficient to prevent vaporization of the propane, this vaporization causing a vapor lock, which in turn stops the flow of propane.

Propane is withdrawn from the chilling tank 13 through lines 21 and 22 and is forced to the chiller and crystallizer 18 to supply additional propane which may be needed for finally chilling the propane-oil solution. The chilled propane-oil solution is passed, before the wax has settled, from the chiller and crystallizer 18 through line 32 to pump 33 and is forced by this pump through line 34 to and through a filter 30, which has a number of filtering units 31. Pump 33 is provided with a jacket 35 having a valved propane inlet 36 and a vent line 37 leading to gaseous propane return header 16. This pump jacket performs the same function as the jacket of pump 24, liquid propane being admitted through line 36 and vaporized within the jacket to cool the pump, the vaporized propane passing out through line 37.

Within the filter 30, the oil propane solution is separated from the crystallized wax by means of the filter units 31. The oil-propane solution outflows from the top of filter 31 through line 38 and valved line 39 to tower 40, wherein the propane still remaining in solution in the oil is vaporized. Tower 40 may be furnished with a steam coil 41 to provide any heat necessary to insure complete vaporization and separation of propane from the dewaxed oil. The dewaxed oil passes from the bottom of the tower through line 42 and the vaporized propane passes from the top of the tower through valved line 43 to the gaseous propane return header 16.

The wax separated by the filter units of the filter tank 31 is withdrawn through line 44 by means of pump 45. The wax separated from some oils does not separate readily from the filter elements and fall to the bottom of tank 30. It must therefore be removed. To accomplish this the flow of propane-oil solution to the filter is stopped and propane is passed from line 28 through line 38 through the filtering elements in the opposite direction to that taken by the oil-propane solution being filtered. The propane passing through the filter elements forces any accumulated wax from the filtering elements and washes it out through the bottom of the tank through line 44. This wax propane slurry may then be separated by heating it in a tank, by means of a steam coil, the tank having the proper gaseous propane vent. If desired, additional liquid propane may be added to the oil-propane solution passing into filter tank 30 by means of the valved cross-connection 46 from line 28 to line 34.

The gaseous propane from return header 16 is compressed by compressor 50, condensed in cooler 51 and returned to propane storage tank 1 through line 52.

From the foregoing it is apparent that the system described is capable of a smooth operation, free from the disadvantages caused by vapor lock troubles and clogged filters.

Where, in the claims, propane is specified, it is meant to include all liquid normally gaseous refrigerants, such as sulphur dioxide, ethane propane mixtures, propane butane mixtures, butane, liquid carbon dioxide, or the like, when such refrigerant is being transferred under conditions of substantial vapor pressure equilibrium at a temperature substantially lower than the surrounding atmosphere.

Having now described our invention, what we claim and desire to protect by Letters Patent is:

1. In a propane dewaxing system, a propane tank, an oil chilling and crystallizing tank, a pump for forcing propane from the propane tank to the oil chilling tank, said pump comprising a pump chamber and a jacket closed from communication with the pump chamber, and means for admitting propane to and expanding propane within the pump jacket, thereby chilling the pump chamber and preventing evaporation of the propane being pumped therethrough.

2. In a propane dewaxing system, a propane tank, an oil chilling and crystallizing tank, a pump for forcing propane from the propane tank to the oil chilling tank, a second pump for removing the oil-wax-propane mixture from the chilling and crystallizing tank, each pump comprising a pump chamber and a jacket closed from communication with the pump chamber and means for admitting propane to and expanding propane within each pump jacket, thereby chilling each pump chamber and preventing evaporation of the propane flowing through each pump chamber.

3. In a propane dewaxing system, a propane storage tank, an oil storage tank, means for mixing oil and propane from said tanks, a propane chilling tank, a coil in said propane chilling tank for prechilling the oil-propane mixture, a chilling and crystallizing tank, means for feeding the prechilled oil-propane mixture to the chilling and crystallizing tank, means for adding propane to the prechilled oil-propane mixture in said chilling and crystallizing tank, said last means comprising a pump including a pump chamber and a jacket closed from communication with the pump chamber, and means for admitting propane to and expanding propane within the pump jacket under a pressure lower than that existing at the intake of the pump chamber.

4. In a propane dewaxing system, a propane storage tank, an oil storage tank, means for mixing oil and propane from said tanks, a propane chilling tank, a coil in said propane chilling tank for prechilling the oil-propane mixture, a chilling and crystallizing tank, means for feeding the prechilled oil-propane mixture to the chilling and crystallizing tank, means for adding propane to the prechilled oil-propane mixture in said chilling and crystallizing tank, a filter for the chilled propane-oil mixture, means for passing chilled propane-oil mixture from the chilling and crystallizing tank to the filter, said last means comprising a pump including a pump chamber and a jacket closed from communication with the pump chamber, and means for admitting propane to and expanding propane within the pump jacket under a pressure lower than that existing at the intake of the pump chamber.

5. In a propane dewaxing system, an oil chiller and crystallizer and means to supply propane thereto, a filter for the chilled propane mixture, means, including a pump, for passing chilled propane-oil mixture from the chiller and crystallizer to the filter, said pump including a pump chamber and a jacket closed from communication with the pump chamber, and means for admitting propane to and expanding propane within the pump jacket under a pressure lower than that existing at the intake of the pump chamber.

6. In a propane dewaxing system, a pre-chiller adapted to receive propane and an oil-propane mixture in heat exchange relation, a chiller and crystallizer adapted to receive the prechilled oil-propane mixture from the pre-chiller, means, including a pump, for passing propane to the chiller and crystallizer, said pump including a pump chamber and a jacket closed from communication with the pump chamber, and means for admitting propane to and expanding propane within the pump jacket under a pressure lower than that existing at the intake of the pump chamber.

7. In the operation of dewaxing oil by means of a normally gaseous hydrocarbon wherein a liquid solution of oil and said hydrocarbon is pumped from one locus to another, the process of preventing absorption of heat by the solution while being pumped with resultant danger of vapor lock in the pump which comprises substantially surrounding the liquid solution while it is being pumped with said hydrocarbon in mainly gas phase and under a pressure and temperature below the pressure and temperature of the liquid solution being pumped.

8. In the operation of dewaxing oil by means of a normally gaseous hydrocarbon wherein a liquid solution of oil and said hydrocarbon is pumped from one locus to another, the process of preventing absorption of heat by the solution while being pumped with resultant danger of vapor lock in the pump which comprises flowing said hydrocarbon through a separate circuit in heat exchange relation but out of contact with the solution being pumped and reducing the pressure in said separate circuit to effect expansion of the hydrocarbon therein into a gas with resultant lowering of its temperature below that of the solution with which it is in heat exchange relation.

DANIEL B. BANKS.
PAUL D. BARTON.